United States Patent
Lee et al.

(10) Patent No.: US 7,329,472 B2
(45) Date of Patent: Feb. 12, 2008

(54) FUEL CELL SYSTEM AND STACK USED THERETO

(75) Inventors: Dong-Hun Lee, Suwon-si (KR);
Ho-Jin Kweon, Suwon-si (KR);
Seong-Jin An, Suwon-si (KR);
Hyoung-Juhn Kim, Suwon-si (KR);
Jun-Won Suh, Suwon-si (KR);
Jong-Man Kim, Suwon-si (KR);
Hae-Kwon Yoon, Suwon-si (KR);
Yeong-Chan Eun, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 393 days.

(21) Appl. No.: 11/054,892

(22) Filed: Feb. 10, 2005

(65) Prior Publication Data
US 2005/0214625 A1    Sep. 29, 2005

(30) Foreign Application Priority Data
Mar. 25, 2004    (KR)    ............. 10-2004-0020358

(51) Int. Cl.
*H01M 2/14*    (2006.01)
(52) U.S. Cl. ........................................... 429/39
(58) Field of Classification Search ............ 429/34, 429/39, 38, 32
See application file for complete search history.

(56) References Cited

U.S. PATENT DOCUMENTS
2003/0157387 A1    8/2003    Hase et al.

FOREIGN PATENT DOCUMENTS
CN    1460303    12/2003
JP    2000-277127    10/2000

*Primary Examiner*—Patrick Joseph Ryan
*Assistant Examiner*—Thomas H. Parsons
(74) *Attorney, Agent, or Firm*—Christie, Parker & Hale, LLP

(57) ABSTRACT

Disclosed is a fuel cell system wherein the flow of fuel and oxygen is optimized thereby improving the thermal efficiency of the entire system. The fuel cell system comprises at least one stack for generating electrical energy by an electrochemical reaction between hydrogen gas and oxygen, a fuel supply portion for supplying fuel to the stack, and an oxygen supply portion for supplying oxygen to the stack. The stack is formed in a stacked configuration with MEAs and separators. The separators are positioned on either surface of the MEAs. The separators have a plurality of ribs proximate to the MEAs which define a plurality of channels wherein the ratio of a width of the channels to the width of the ribs is from about 0.8 to 1.5.

12 Claims, 6 Drawing Sheets

FUEL CELL SYSTEM AND STACK USED THERETO

CROSS REFERENCE TO RELATED APPLICATION

This application claims priority to and the benefit of Korea Patent Application No. 10-2004-0020358 filed on Mar. 25, 2004 in the Korean Intellectual Property Office, the content of which is incorporated by reference as if fully set forth herein.

FIELD OF THE INVENTION

The present invention relates to a fuel cell system and stacks used thereto, and more particularly, to a fuel cell system and stacks used to optimize the size of a passage formed between separators (for example, Bipolar Plate) and the Membrane Electrode Assembly (herein referred to as MEA).

BACKGROUND OF THE INVENTION

A fuel cell is a system for producing electric power. In a fuel cell, chemical reaction energy between oxygen and hydrogen contained in hydrocarbon-group materials (e.g., methanol, natural gas) is directly converted into electric energy. Such a fuel cell is characterized by the production of electric energy and thermal energy as a by-product of an electrochemical reaction occurring without combustion.

Depending on the type of electrolyte used in a fuel cell, the fuel cell may be classified into one of many different types of fuel cells, for example, phosphate fuel cells, molten carbonate fuel cells, solid oxide fuel cells, and polymer electrolyte or alkali fuel cells. Although each of these different types of fuel cells operate using the same principles, they differ in the type of fuel, catalyst, and electrolyte used, as well as in drive temperature.

A polymer electrolyte membrane fuel cell (PEMFC) has been developed recently. Compared to other fuel cells, the PEMFC has excellent output characteristics, a low operating temperature, and fast starting and response characteristics. The PEMFC may be used for vehicles, in the home and in buildings, and for the power source in electronic devices. The PEMFC, therefore, has a wide range of applications.

The basic components of the PEMFC are a stack, a fuel tank, and a fuel pump. The stack forms a main body of the fuel cell. The fuel pump supplies fuel reserved in the fuel tank to the stack. A reformer may also be used to reform the fuel to create relatively pure hydrogen gas and to supply the hydrogen gas to the stack.

In the PEMFC, the fuel pump operates to send the fuel from the fuel tank to the reformer. The fuel is reformed in the reformer to generate hydrogen gas, and the hydrogen gas is chemically reacted with oxygen in the stack to generate electric energy.

Fuel cells using Direct Methanol Fuel Cell (herein referred to as "DMFC") supply liquid methanol fuel containing hydrogen directly to the stack and therefore may not include a reformer. This lack of a reformer is a difference between the PEMFC and DMFC.

FIG. 8 is a partial cross section of a stack used in a fuel cell system according to the prior art where MEAs are assembled with separators.

With reference to FIG. 8, some embodiments of a fuel cell may include a stack for substantially generating electricity. The stack may be composed of a structure of stacked unit cells. The stacked unit cells may contain a few unit cells, or ten or more unit cells having MEAs 51 and separators 53.

The MEAs 51 have an electrolyte membrane and an anode electrode and a cathode electrode mounted on opposite surfaces thereof. The separators 53 have passages 55, 57 through which the hydrogen gas and/or air needed for the oxidation/reduction reaction of the MEAs 51 is supplied to the anode electrode and the cathode electrode.

That is, the hydrogen gas is supplied to the anode electrode and the air is supplied to the cathode electrode through passages 55 and 57, respectively, of the separator 53. In this process, the hydrogen gas oxidizes at the anode electrode and the oxygen reduces at the cathode electrode. The flow of electrons generated during this operation creates a current. In addition, water and heat are generated by the electrochemical reactions.

In more detail, each separator 53 includes plurality of ribs 59 closely faced against the adjacent surfaces of MEAs which define the passages 55, 57 for supplying the hydrogen gas and air needed. Substantially, the passages interpose between each of the ribs 59.

Generally, where separators are positioned on both sides of MEAs 51, the passages 55, 57 for supplying each of the hydrogen gas and air needed are orthogonal to each other. Thus, in the cross-section illustrated in FIG. 8, a single passage 55 for supplying the hydrogen gas is illustrated while a plurality of passages 57 for supplying air are illustrated.

In the fuel cell system described above, the structure of a stack should enhance the diffusing performance in the stack while maintaining the pressure of the fuel during diffusion in order to enhance the efficiency of fuel cell. Here, one important condition for designing the structure of a stack is the size of the passages 55, 57. That is, in the separator 53, the size of passages plays an important role in diffusing hydrogen gas and air to diffusing layers thereof from the active area of MEA 51, and also for handling the contact resistance of current generated in MEA 51.

SUMMARY OF THE INVENTION

In one aspect of the present invention, there is provided a fuel cell system optimizing the ratio of width of a channel to a width of a rib forming the passage for supplying fuel and air, thereby improving the fuel diffusing performance and reducing the pressure drop therein.

In an exemplary embodiment of the present invention, a fuel cell system includes at least one stack for generating electrical energy by an electrochemical reaction between hydrogen and oxygen; a fuel supply portion for supplying fuel to the stack; and an oxygen supply portion for supplying oxygen to the stack. The stack is formed into a stacked configuration with a plurality of MEAs separated by separators. The separators have ribs which closely contact the adjacent MEAs and form channels through which the oxygen and hydrogen flow. The ratio of the width of a channel to the width of a corresponding rib is between about 0.8 and about 1.5.

The channels serve as passages for supplying the hydrogen and oxygen to the stack. The passages for supplying hydrogen are generally disposed on one side of a separator adjacent to an anode electrode. The passages for supplying oxygen are disposed in other side of each separator adjacent to the cathode electrode. The passages supplying the hydrogen are generally orthogonal to the passages supplying the oxygen.

In an embodiment of the invention, an active area of MEAs is below 40 cm$^2$ and the width of the channels are within a range from about 0.8 mm to about 1.4 mm. The rib is configured to project from the separator and the channel is configured to be recessed into the separator.

DETAILED DESCRIPTION

Exemplary embodiments of the present invention will now be described in detail with reference to the accompanying drawings.

Figure 1:
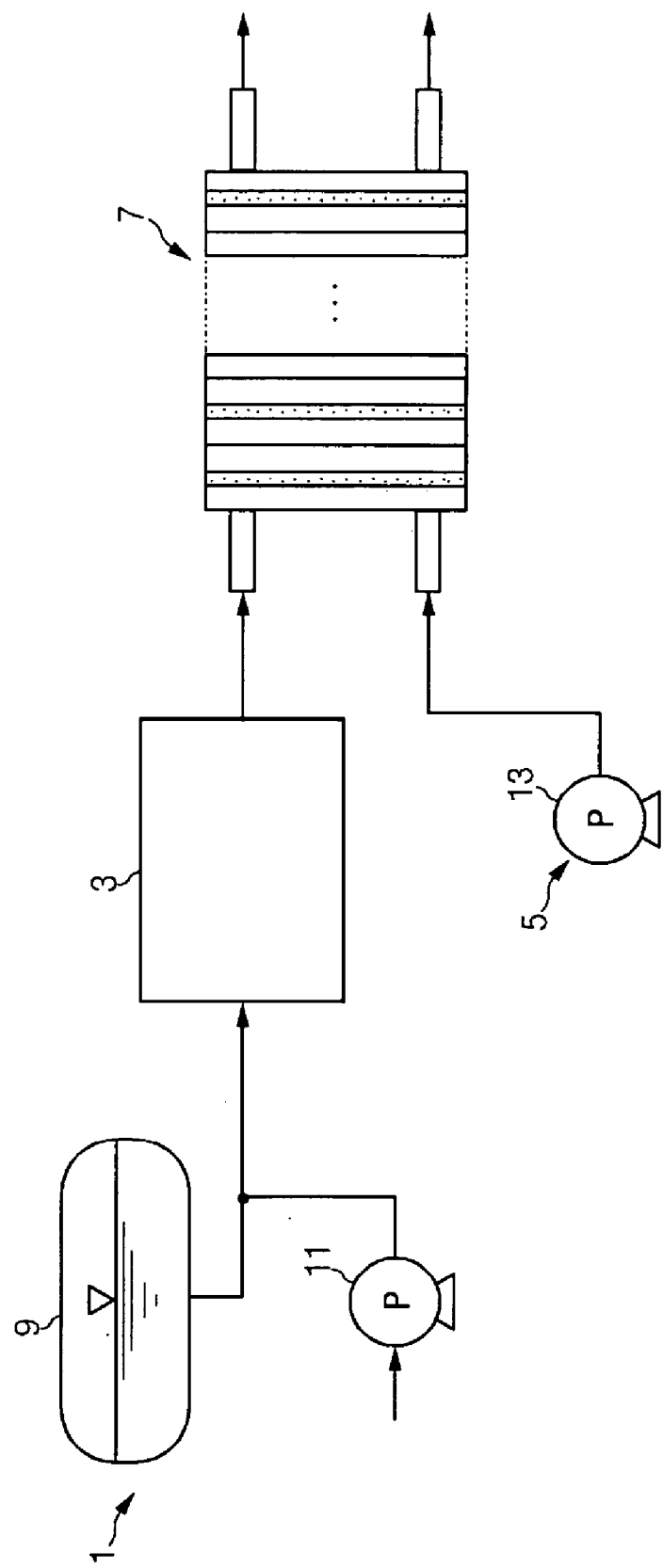
FIG. 1 is a schematic view of a fuel cell system according to an exemplary embodiment of the present invention.
Figure 2:
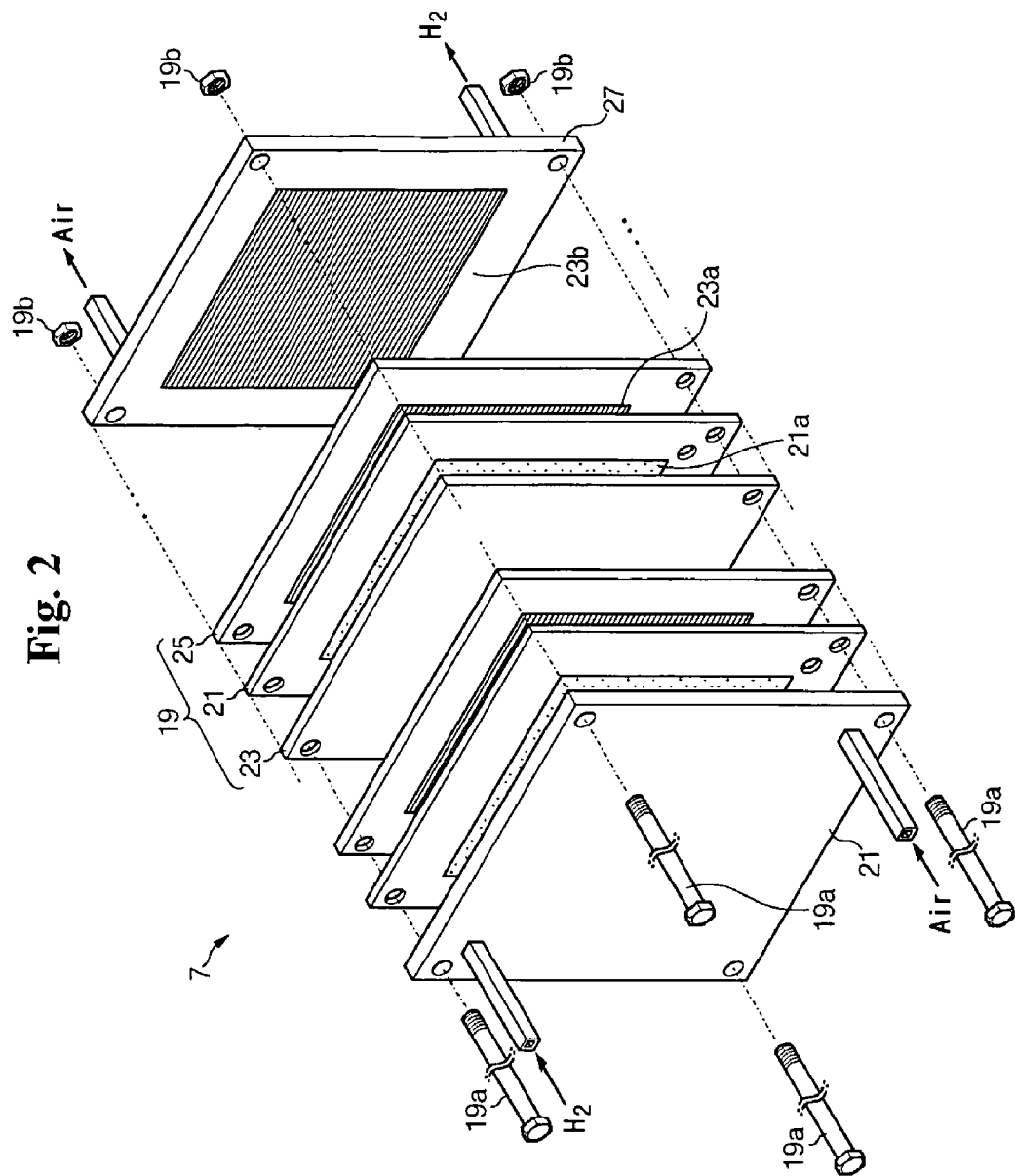
FIG. 2 is an exploded perspective view of a stack of FIG. 1.

FIG. 1 is a schematic view of a fuel cell system according to an exemplary embodiment of the present invention; FIG. 2 is an exploded perspective view of a stack of FIG. 1.

With reference to FIG. 1 and FIG. 2, in an embodiment of the invention, a fuel cell system may include fuel supply portion 1 for supplying fuel to reformer 3. Hydrogen gas generated from the supplied fuel in reformer 3 may be provided to stack 7. In addition, oxygen supply portion 5 supplies air to the stack 7. In the stack 7 the chemical reaction energy of the hydrogen gas and oxygen contained in air is converted into electrical energy to thereby generate electricity.

Fuel supply assembly 1 includes fuel tank 9 and pump 11. Fuel may be stored in fuel tank 9. The fuel used in some embodiments may be a liquid fuel, for example methanol or ethanol, or it may be a gaseous fuel such as natural gas. In this embodiment, the pump 11 provides liquid fuel to a reformer 3 where hydrogen gas is generated. The hydrogen gas then flows into stack 7.

In an embodiment of a fuel cell system, a liquid fuel containing hydrogen may be directly supplied to stack 7 as in a DMFC system. In the following, it will be assumed that the fuel cell system applies with the PEMFC type.

Figure 3:
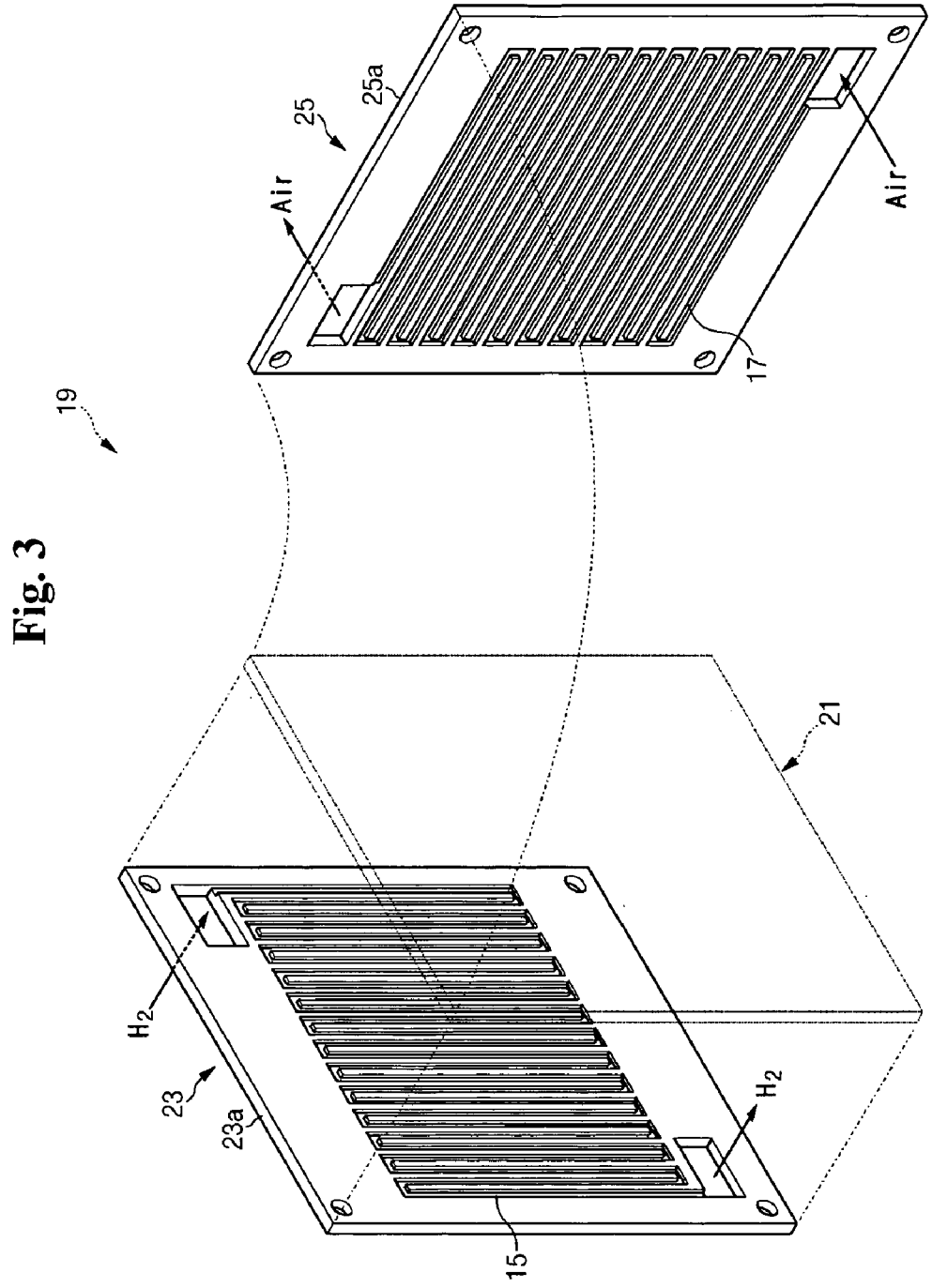
FIG. 3 is an exploded perspective view of a unit cell composing a stack of FIG. 1.

As shown in FIGS. 1 and 3, air supply portion 5 includes an air pump 13 for producing air to stack 7. In stack 7, air flows through air passages 17. Hydrogen gas flows through hydrogen passages 15 in stack 7.

As shown in FIG. 1 hydrogen gas is supplied to stack 7 through fuel supply portion 1 and from reformer 3. Air is supplied to stack 7 through air supply portion 5. Electrical energy is generated through an electrochemical reaction between hydrogen gas and oxygen present in the external air. In addition, heat and water are generated.

FIG. 3 illustrates a stack 7 having at least one unit cell 19 for generating electrical energy through an oxidation/reduction reaction of hydrogen gas generated by the reformer 3 with oxygen contained in the air. Each of the unit cells 19 forms a minimum unit cell for generating electricity by interposing a membrane electrode assembly (MEA) 21 between two separators 23, 25. FIG. 2 depicts a plurality of such unit cells 19 combined to form the stack 7 of an embodiment having a stacked configuration. End plates 27 are mounted to opposite outermost layers of a plurality of unit cells 19. End plates 27 may be an alternative structure of separators 23, 25. A plurality of unit cells 19 are combined by means of fastening bolts 19a penetrating the outermost layers thereof and fastened with nuts 19b to form stack 7 of a stacked configuration.

Figure 4:
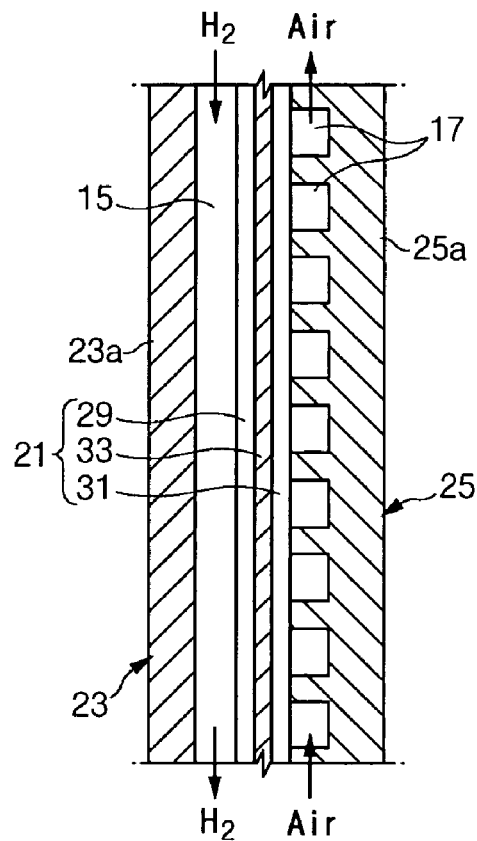
FIG. 4 is a partial cross section of a stack of FIG. 1, where an MEA is assembled with separators.

FIG. 3 is an exploded perspective view of the unit cell composing a stack of FIG. 1. FIG. 4 is a partial cross section of a stack of FIG. 1, where MEA assembled with separators.

With reference to FIGS. 3 and 4, each of the separators 23, 25 is positioned proximate to a surface of a MEA 21 to form hydrogen passages 15 and air passages 17 between separators 23, 25 and the surface of MEAs 21. The hydrogen passage 15 is adjacent to an anode electrode 29 of the MEA 21. The air passage 17 is adjacent to cathode electrode 31 of MEA 21. Here, the hydrogen passage 15 and the air passage 17 may be arranged in a parallel stripe configuration on the body 23a, 25a of separators 23, 25, and hydrogen passage 15 and air passage 17 are generally positioned such that the passages are orthogonal to each other. However, in other embodiments, hydrogen passages 15 and air passages 17 may be arranged in other configurations.

As is further shown in FIGS. 2 through 4, when separators 23, 25 closely contact with the surface of MEA 21, the hydrogen passages 15 are arranged vertically. Air passages 17 formed between the surface of MEA 21 and separator 25 is arranged laterally so that the air passages 17 are orthogonal to the hydrogen passages 15.

MEA 21 is interposed between a pair of separators 23, 25 which include an active area 21a (depicted in FIG. 2) with a predetermined size where the oxidation/reduction reaction occurs. Anode electrode 29 and cathode electrode 31 may be positioned on either side surface of active area 21a or with electrolyte membrane 33 interposed between both of the electrodes 29, 31.

In more detail, the hydrogen gas is supplied to anode electrode 29 through hydrogen passage 15 formed between anode electrode 29 of MEA 21 and separator 23. The hydrogen gas is supplied to a gas diffusion layer to diffuse toward a catalyst layer. The catalyst layer promotes an oxidation reaction of hydrogen gas, and converted electrons are attracted outwardly so that current is generated by the flow of electrons. Hydrogen ions move to cathode electrode 31 through the electrolyte membrane 33.

In addition, the oxygen contained in the air is supplied to the cathode electrode 31 through oxygen passage 15 formed between cathode electrode 31 of MEA 21 and separators 25 closely contacting each other. As with the hydrogen, the oxygen is supplied to a gas diffusion layer to diffuse toward the catalyst layer. The catalyst layer promotes the conversion reaction of the hydrogen ions, electrons, and oxygen to produce electricity and water.

Further, the electrolyte membrane 33 is formed from solid polymer electrolyte and has a depth of 50 to 200 μm. Hydrogen ions generated in the catalyst layer of anode electrode 29 move through the electrolyte membrane 33 toward oxygen ions generated in the catalyst layer of the cathode electrode 31. The resultant ion exchange generates water.

Figure 5:
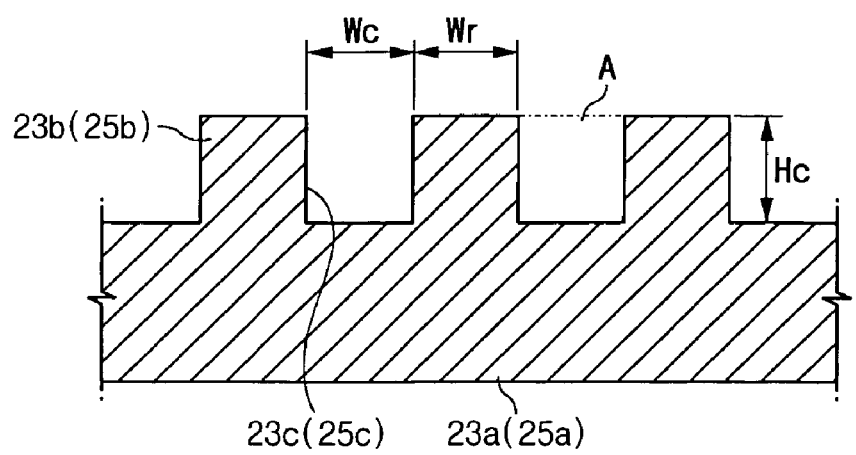
FIG. 5 is an exploded partial cross section of a separator of FIG. 1.

FIG. 5 is an exploded partial cross section of a separator as depicted in FIG. 1. Since separators 23, 25 are structurally similar to each other, FIG. 5 depicts one separator 23, however, the following description may describe both separators 23, 25.

With reference to FIG. 5, separators 23, 25 include a plurality of passages for supplying hydrogen gas and air needed for the oxidation/reduction reaction occurring at the electrodes 29, 31 of MEA. These passages may be either hydrogen passages 15 or oxygen passages 17 as described above. Hydrogen passages 15 and oxygen passages 17 are formed when each of separators 23, 25 contact closely with the either surface of MEA 21 (shown in FIG. 4). The hydrogen passage 15 is disposed adjacent to anode electrode 29 of MEA 21. The air passage 17 is disposed adjacent to cathode electrode 31 of MEA 21. Ribs 23b, 25b projecting from one side of the body 23a, 25a of separators 23, 25 define channels 23c, 25c. In an embodiment, channels 23c, 25c may be used as hydrogen passage 15 or as an air passage 17 when separators 23, 25 are positioned proximate MEA 21.

Such a structure allows the size of the channel 23c, 25c to automatically set the size of the ribs 23b, 25b where a surface area of active area 21a of MEA 21 is set. In one embodiment, the cross sectional area of the ribs 23b, 25b and channels 23c, 25c (the cross sectional area taken along a vertical line in the longitudinal direction) may approximate a square. However, alternate geometries for the cross sectional area may be used.

Channel 23c forming hydrogen passage 15 is connected with reformer 3 and channel 25c forming air passage 17 is connected with air pump 13. Accordingly, the rich hydrogen gas generated in the reformer 3 and the air pumped by the pump 13 are supplied to end plates 27 through the hydrogen passage 15 and the air passage 17. In an embodiment shown in FIG. 4, the rich hydrogen gas and the air are supplied to end plates on opposite sides of unit cell to allow the rich hydrogen gas to flow counter to the air. Any remaining hydrogen gas and air exhaust at the other end plate 27.

The width Wr of ribs 23b, 25b and the width Wc of channels 23c, 25c may affect the rate at which hydrogen gas and air flow through passages 15, 17. Accordingly, the cross section A will be determined by the width Wc and height Hc of passages 15, 17 forming channels 23c, 25c. When the width Wr of ribs 23b, 25b or the width Wc of channels 23c, 25c is not constant, an average value may be used.

To enhance the efficiency of a fuel cell, it is desired that the contact resistance of current occurring in the stack be maintained within an allowable range. It is further desired that the gas diffusing layers of MEA 21 have increased hydrogen or oxygen gas diffusing performance and reduced pressure drop across the stack. To achieve these goals, the cross section A of passages 15, 17, that is, channels 23c, 25c of separators 23, 25 should be appropriately controlled. In this embodiment, the ratio of the width Wr of ribs 23b, 25b and the width Wc of channels 23c, 25c is optimized to achieve these.

In order to enhance the diffusing performance of the hydrogen gas and air and the energy for supplying them to the stack, the Relative Power Density (hereafter, referred to as "RPD") is used to test the performance of a fuel cell. The RPD is calculated by subtracting the value of the power consumed in stack 7 from the value of the power generated in stack 7, and then the resultant difference value is divided by the total area of the active area 21a. Such RPD values are shown in tables 1, 2. Table 1 shows the relationship of the width Wc of channels 23c, 25c with RPD.

TABLE 1

| | Width of channel (mm) | | | |
|---|---|---|---|---|
| | 0.5 | 0.8 | 1 | 1.2 |
| RPD(mW/cm²) | 142 | 248 | 254 | 259 |

After the hydrogen gas is supplied to anode electrode 29 and the oxygen gas is supplied to cathode electrode 31, RPD is calculated whenever the width Wc of channels 23c, 25c is changed at a non-heated state. The results are illustrated in FIG. 6.

Figure 6:
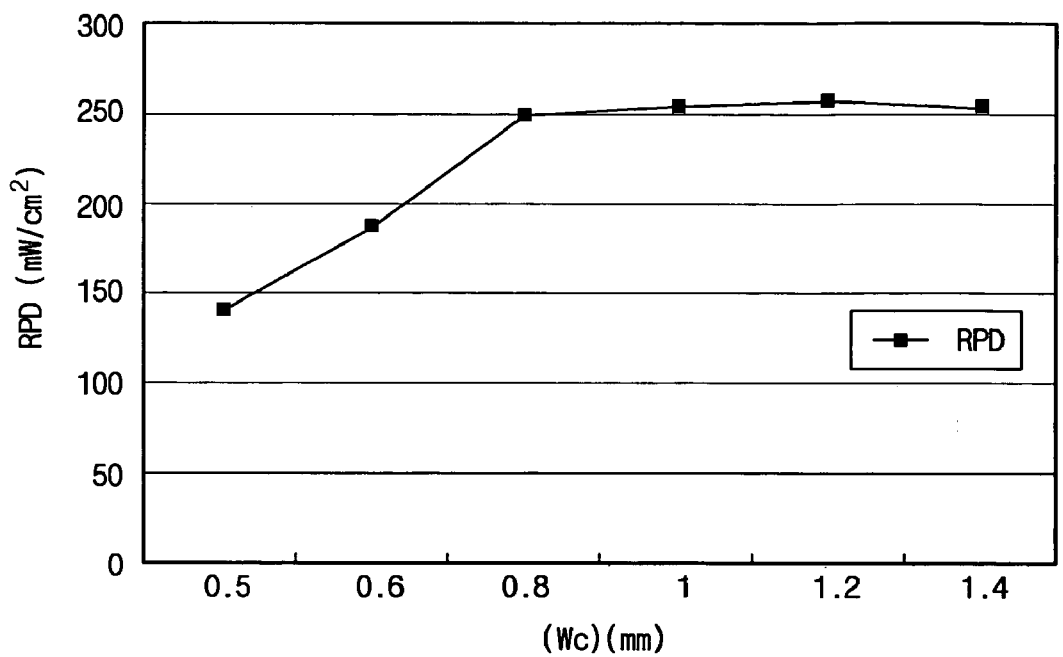
FIG. 6 is a graph illustrating the relationship of the width of the channel which forms hydrogen passage and the air passage with the Relative Power Density (hereafter, referred to as "RPD")

FIG. 6 is a graph illustrating the relationship of the width of the channel which forms hydrogen passage and the air passage with RPD.

Referring to FIG. 6, fuel cell performance is enhanced when the width Wc of the channels 23, 25 is greater, allowing for increased diffusion of hydrogen gas and oxygen. However, the channels 23c, 25c are arranged proximate an active area having predetermined area so that if the width of the channels 23c, 25c exceeds a predetermined width, the width Wr of ribs 23b, 25b reduces. If the width Wr of ribs 23b, 25b is reduced below a predetermined width, the contact resistance against current occurring in MEAs 21 is increased. Accordingly, it is noted that there is a limit in enhancing the performance of fuel cell by broadening the width Wc of channels 23c, 25c and narrowing the width Wr of ribs 23b, 25c below a predetermined width.

In an experimental test, it was determined that when active area 21a of MEAs 21 is below 40 cm², the optimum width Wc of the channel 23c, 25c is in a range from about 0.8 mm to about 1.4 mm.

Table 2 shows the relationship of the ratio of the width Wc of channels 23c, 25c to the width Wr of ribs 23b, 25b with the RPD.

TABLE 2

| | Ratio (Wc/Wr) | | | |
|---|---|---|---|---|
| | 0.5 | 1 | 1.2 | 1.5 |
| RPD(mW/cm²) | 172 | 255 | 252 | 265 |

Figure 7:
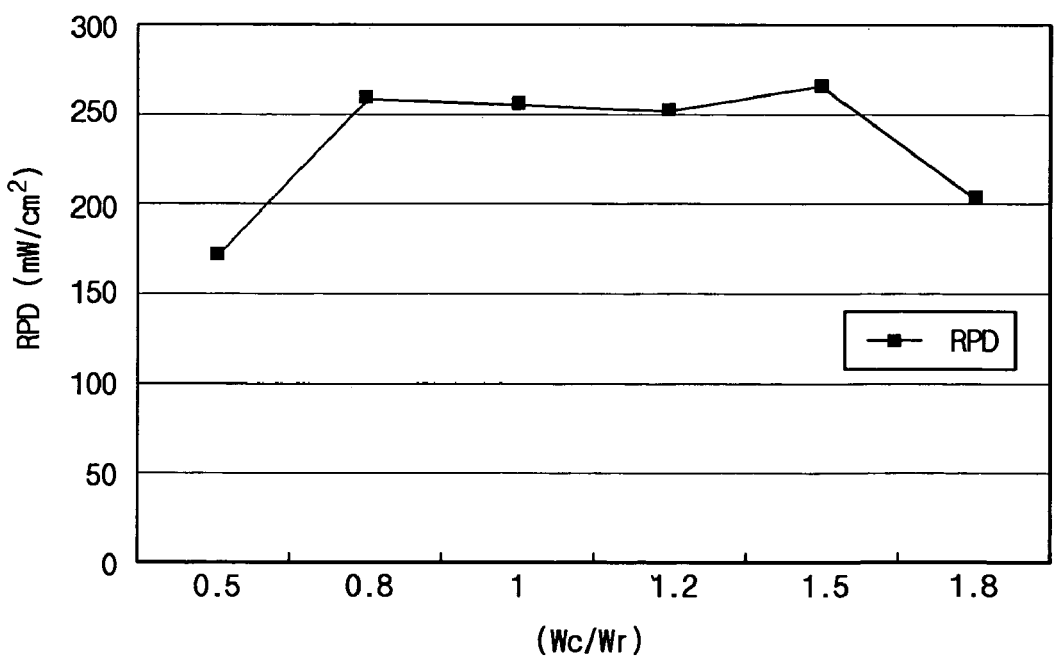
FIG. 7 is a graph illustrating the relationship of the width of a rib which forms hydrogen passage and the air passage with RPD.
Figure 8:
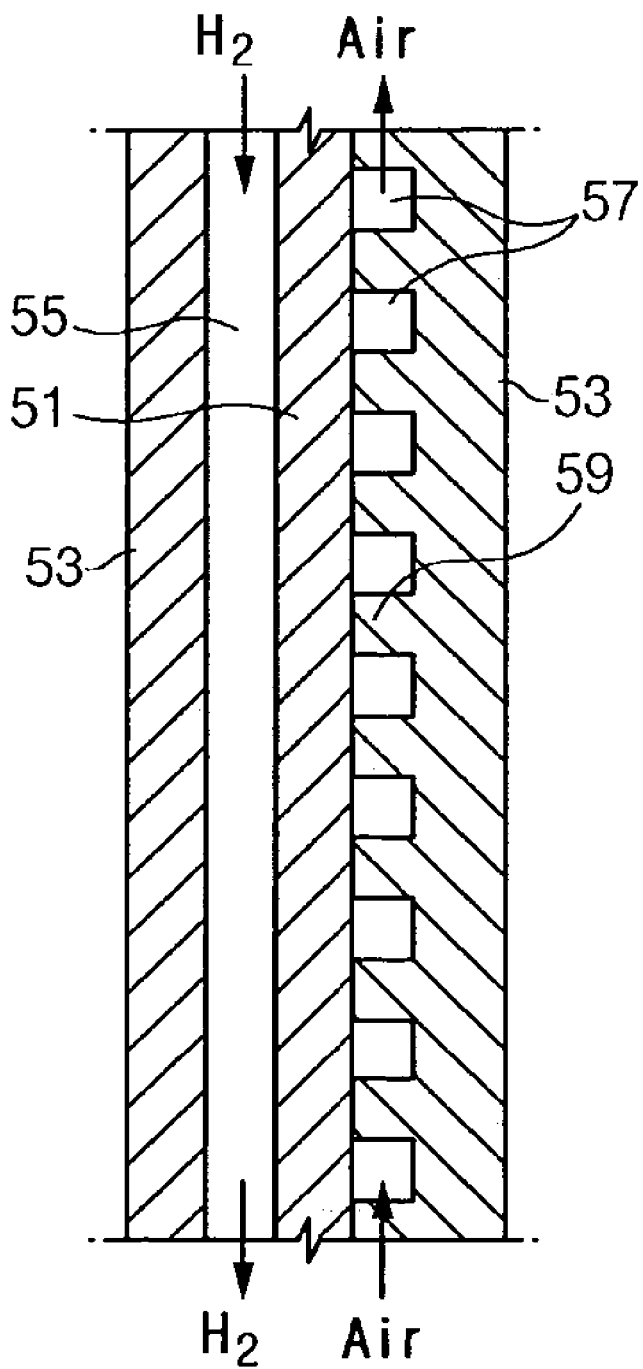
FIG. 8 is a partial cross section of stack used in a conventional fuel cell system, where MEAs assembled with separators.

After hydrogen gas is supplied to anode electrode 29 and oxygen gas is supplied to cathode electrode 31, RPD is calculated whenever the ratio of the width Wc of channels 23c, 25c to the width Wr of ribs 23b, 25b is changed at non-heated state. The results are illustrated in FIG. 7. FIG. 7 is a graph illustrated the relationship of the width of rib which forms hydrogen passage and the air passage with RPD.

Referring to FIG. 7, it will be known that RPD is preferable when a ratio Wc/Wr of the width Wc of channels 23c, 25c to the width Wr of ribs 23b, 25b is within a range from about 0.8 to about 1.5. In an embodiment, a value of the ratio Wc/Wr will be in a range from about 0.8 to about 1 will be preferred. Alternatively, a value of the ratio Wc/Wr in a range from about 1.2 to about 1.5 may be desired in some embodiments.

In more detail, if a value of the ratio Wc/Wr is below 0.8, RPD is reduced since a connect face with which the active area 21a of the MEA contacts the gas diffusing layer is reduced. The contact resistance (reducing factor of RPD) against the contact face increases exponentially relative to the increasing rate of the hydrogen and air velocity (increasing factor of RPD) passing through the contact face, thereby the total of RPD is reduced. Also, if the hydrogen and air velocity (increasing factor of RPD) passing through the contact face is increased, the internal pressure occurring in the channels 23c, 25c is reduced.

On the other hand, if the ratio Wc/Wr is within a range from about 1.5 to about 1.8, RPD is reduced. Although the connect face with which the active area 21a of the MEA contacts the gas diffusing layer is increased, the velocity and contact resistance of the hydrogen and air passing through the contact face is reduced. Therefore, there is a limit in enhancing the performance of fuel cell by broadening the width Wc of channels 23c, 25c and narrowing the width Wr of ribs 23b.

Consequently, if the value of the ratio Wc/Wr is within a range from 0.8 to 1.5, the value of the RPD is preferable. This reason is that the width Wr of ribs 23b, 25b is increased to reduce the contact resistance, the velocity of the hydrogen gas and air is increased to increase the diffusing velocity.

Although embodiments of the present invention have been described in detail hereinabove in connection with certain embodiments, it should be understood that the invention is not limited to the disclosed embodiments, but, on the contrary is intended to cover various modifications and/or equivalent arrangements included within the spirit and scope of the present invention, as defined in the appended claims.

As discussed above, the fuel cell system described above has a structure to enable the width ratio of channel portion and rib portion of the separator contacted closely with MEA to optimize such that the thermal efficiency of the entire system is improved.

Further, the fuel cell system of the present invention has a structure to enable the contact resistance of current occurring therein to maintain it within the predetermined range, thereby improving the fuel diffusing performance and reducing a pressure dropping therein.

What is claimed is:

1. A fuel cell system, comprising:
    at least one stack for generating electrical energy by an electrochemical reaction between hydrogen gas and oxygen;
    a fuel supply portion for supplying fuel to the stack; and
    an oxygen supply portion for supplying oxygen to the stack,
    wherein the stack comprises a plurality of MEAs (Membrane Electrode Assemblies) and separators with separators positioned on either surface of each MEA, the separators having a plurality of ribs in close contact with the MEAs, the ribs defining channels, wherein the ratio of the width of the channels to the width of the ribs is from about 1.2 to about 1.5.

2. The fuel cell system of claim 1, wherein the channels serve as passages for supplying the hydrogen and oxygen.

3. The fuel cell system of claim 2, wherein the passages supplying hydrogen are disposed on one side of the separator adjacent to an anode electrode; and the passages supplying oxygen are disposed on the other side of the separator adjacent to a cathode electrode.

4. The fuel cell system of claim 2, wherein the passages supplying the hydrogen are orthogonal to the passages supplying the oxygen.

5. The fuel cell system of claim 1, wherein each MEA has an active area less than 40 cm$^2$, and the width of the channels is from 0.8 to 1.4 mm.

6. The fuel cell system of claim 1, wherein the ribs are configured to project from the separators and the channels are configured to be recessed into the separators.

7. A stack comprising:
    MEAs (Membrane Electrode Assemblies) for promoting an oxidation/reduction reaction between hydrogen and oxygen; and
    separators for supplying the hydrogen gas and oxygen to the MEAs,
    wherein the separators include a plurality of ribs in close contact with the MEAs and defining a plurality of channels, wherein the ratio of the width of a channel to the width of a rib is from about 1.2 to about 1.5.

8. The stack of claim 7, wherein the channels serve as passages for supplying the hydrogen and oxygen.

9. The stack of claim 8, wherein the passages for supplying hydrogen are disposed on one side of each separator adjacent to an anode electrode and the passages supplying the oxygen are disposed on the other side of each separator adjacent to a cathode electrode.

10. The stack of claim 8, wherein the passages for supplying the hydrogen are orthogonal to the passages for supplying the oxygen.

11. The stack of claim 7, wherein each MEA has an active area of less than 40 cm$^2$, and the width of the channels is from 0.8 mm to 1.4 mm.

12. The stack of claim 7, wherein the ribs are configured to project from the separators and the channels are configured to be recessed into the separators.

* * * * *